(12) United States Patent
Zhang et al.

(10) Patent No.: US 12,437,795 B2
(45) Date of Patent: Oct. 7, 2025

(54) DYNAMIC RANDOM ACCESS MEMORY REFRESH CIRCUIT AND REFRESH METHOD, AND PROOF-OF-WORK CHIP

(71) Applicant: SUNLUNE (SINGAPORE) PTE. LTD., Beijing (CN)

(72) Inventors: Yusheng Zhang, Beijing (CN); Fuquan Wang, Beijing (CN)

(73) Assignee: SUNLUNE (SINGAPORE) PTE. LTD., Beijing (CN)

( * ) Notice: Subject to any disclaimer, the term of this patent is extended or adjusted under 35 U.S.C. 154(b) by 0 days.

(21) Appl. No.: 18/264,414

(22) PCT Filed: Dec. 26, 2022

(86) PCT No.: PCT/CN2022/142051
§ 371 (c)(1),
(2) Date: Aug. 5, 2023

(87) PCT Pub. No.: WO2023/125446
PCT Pub. Date: Jul. 6, 2023

(65) Prior Publication Data
US 2024/0119990 A1    Apr. 11, 2024

(30) Foreign Application Priority Data
Dec. 30, 2021    (CN) .......................... 202111645658.4

(51) Int. Cl.
G11C 11/40    (2006.01)
G11C 11/406    (2006.01)
G11C 11/408    (2006.01)

(52) U.S. Cl.
CPC .. G11C 11/40622 (2013.01); G11C 11/40615 (2013.01); G11C 11/4087 (2013.01)

(58) Field of Classification Search
CPC ........ G11C 11/40622; G11C 11/40615; G11C 11/4087
See application file for complete search history.

(56) References Cited

U.S. PATENT DOCUMENTS 11,195,568 B1    12/2021    Atishay
2005/0135171 A1*    6/2005    Kim .................. G11C 29/12015
365/222

(Continued)

FOREIGN PATENT DOCUMENTS

CN    102081964 A    6/2011
CN    103019974 A    4/2013

(Continued)

OTHER PUBLICATIONS

First Office Action for Chinese Application No. 202111645658.4, dated Jun. 2, 2022, 19 Pages (including English translation).

(Continued)

*Primary Examiner* — Han Yang
(74) *Attorney, Agent, or Firm* — BROOKS KUSHMAN P.C.

(57) ABSTRACT

A DRAM refresh circuit and refresh method, and a proof-of-work chip. The DRAM refresh circuit comprises a row address recording unit, which is configured to record a row that has been accessed in a DRAM within the current refresh cycle; a refresh driving unit, which is configured to be called to perform a refresh operation; and a refresh control unit, which is configured to call, when the refresh control unit is triggered to perform refreshing and according to a record in the row address recording unit, the refresh driving unit to refresh a row that is not accessed in the DRAM within the current refresh cycle.

18 Claims, 2 Drawing Sheets

(56) References Cited

U.S. PATENT DOCUMENTS

| | | |
|---|---|---|
| 2009/0144491 A1 | 6/2009 | Faucher et al. |
| 2009/0161467 A1 | 6/2009 | Lin et al. |
| 2011/0131371 A1 | 6/2011 | Sun et al. |
| 2013/0176803 A1* | 7/2013 | Lee .................. G11C 11/40626 365/207 |
| 2016/0163373 A1* | 6/2016 | Hyun ................ G11C 11/40611 365/189.05 |
| 2016/0254044 A1 | 9/2016 | Bains et al. |

FOREIGN PATENT DOCUMENTS

| | | |
|---|---|---|
| CN | 104143355 A | 11/2014 |
| CN | 103559142 B | 3/2017 |
| CN | 104239220 B | 11/2017 |
| CN | 106856098 B | 2/2020 |
| CN | 113113063 A | 7/2021 |
| CN | 114388025 A | 4/2022 |
| JP | 1995057460 A | 3/1995 |

OTHER PUBLICATIONS

International Search Report for Application No. PCT/CN2022/142051, dated Feb. 22, 2023, 6 Pages (including English translation).

Notification to Grant an Invention Patent for Chinese Application No. 202111645658.4, dated Aug. 24, 2022, 8 Pages (including English translation).

\* cited by examiner

DYNAMIC RANDOM ACCESS MEMORY REFRESH CIRCUIT AND REFRESH METHOD, AND PROOF-OF-WORK CHIP

CROSS-REFERENCE TO RELATED APPLICATION APPLICATIONS

This application is the U.S. national phase of PCT Application No. PCT/CN2022/142051 filed on Dec. 26, 2022, which claims priority to Chinese Patent Application No. 202111645658.4 filed on Dec. 30, 2021, which are hereby incorporated herein by reference in their entireties.

TECHNICAL FIELD

The present application relates to the field of integrated circuits, in particular to a dynamic random access memory refresh circuit, a refresh method thereof, and a proof of work chip.

BACKGROUND

A Dynamic Random Access Memory (DRAM) is a common memory device. In actual applications, there is a leakage current phenomenon in transistors, which leads to a situation where charges stored in capacitors are not enough to correctly decide data, and thereby leads to data corruption, therefore, for a DRAM, periodic charging is needed to maintain data without loss, and the charging operation is referred to as refresh.

A DRAM is composed of a memory matrix of rows and columns. Because only a unified decoding device and a unified chip selection device are provided, it is required to stop reading operations and writing operations when a refresh action is performed, which inevitably affects the work efficiency of other components that need to access the DRAM. In addition, a refresh period of the DRAM is closely related to an operating temperature of the chip. With the increase of the temperature, the refresh period is shorter and the refresh frequency is higher, which further reduces the work efficiency of the other components that need to access the DRAM.

SUMMARY

The following is a summary of the subject matter described in detail in the present application. The summary is not intended to limit the protection scope.

In an aspect, a DRAM refresh circuit is provided in an embodiment of the present application, which includes: a row address recording unit, configured to record a row, which is accessed in a current refresh period, in a DRAM; a refresh drive unit, configured to perform a refresh operation when the refresh drive unit is invoked; and a refresh control unit, configured to, when refresh is triggered, invoke the refresh drive unit to refresh a row, which is not accessed in the current refresh period, in the DRAM according to a record of the row address recording unit.

In an exemplary implementation, that the row address recording unit is configured to record the row, which is accessed in the current refresh period, in the DRAM, includes: the row address recording unit is configured to store respective row flag bits which correspond to all rows in the DRAM, and reset all row flag bits at beginning of each refresh period, and set a corresponding row flag bit according to a row to be accessed in an access request for the DRAM.

In an exemplary implementation, the row address recording unit is a register, a quantity of bits in the register is equal to a quantity of rows in the DRAM, and there is a one-to-one correspondence between the rows in the DRAM and the bits in the register.

In an exemplary implementation, the DRAM refresh circuit further includes: a row address splitting unit, configured to record respective rows contained in each of N groups; wherein, all rows in the DRAM are split into the N groups in advance.

That the refresh control unit is configured to invoke the refresh drive unit to refresh the row, which is not accessed in the current refresh period, in the DRAM according to the record of the row address recording unit, includes: the refresh control unit determines whether the each group contains a row which is not accessed in the current refresh period, respectively, according to the record of the row address recording unit and the respective rows contained in the each group recorded by the row address splitting unit; for a group containing a row which is not accessed in the current refresh period, invoke the refresh drive unit to refresh the row which is not accessed in the group.

In an exemplary implementation, determining, by the refresh control unit, whether the each group contains the row which is not accessed in the current refresh period, respectively, according to the record of the row address recording unit and the respective rows contained in the each group recorded by the row address splitting unit, includes: the refresh control unit acquires, from the row address recording unit, values of row flag bits corresponding to the each group respectively according to the respective rows contained in the each group recorded by the row address splitting unit, performs a logical operation on the values of the row flag bits corresponding to the each group in parallel, uses an operation result of the logical operation as a group flag of the each group, and determines whether the each group contains a row, which is not accessed in the current refresh period, according to a value of the group flag of the each group.

In an exemplary implementation, the DRAM refresh circuit further includes: a request storage unit, configured to buffer an access request for the DRAM; a row address decoding unit, configured to parse a row address in the access request and decode the row address from binary data into decimal data.

Recording the row, which is accessed in the current refresh period, in the DRAM by the row address recording unit, includes: the row address recording unit records the row, which is accessed in the current refresh period, in the DRAM, according to a decimal row address obtained by decoding of the row address decoding unit.

In an exemplary implementation, the DRAM refresh circuit further includes a refresh timing unit, configured to record a working time length of the DRAM since a last refresh, when a refresh threshold is reached, trigger the refresh control unit to perform refreshing, and every time a refresh period begins, start timing again.

In another aspect, a proof of work chip is further provided in an embodiment of the present application, which includes a DRAM, a calculation unit and the above-mentioned DRAM refresh circuit.

The calculation unit is configured to access the DRAM and perform calculation.

The DRAM refresh circuit is configured to refresh the DRAM.

In another aspect, a DRAM refresh method is further provided in an embodiment of the present application. The DRAM refresh method includes: in each refresh period, recording a row, which is accessed in the current refresh period, in a DRAM; and when refresh is triggered, refreshing a row, which is not accessed in the current refresh period, in the DRAM according to the recorded row which is accessed in the current refresh period.

In an exemplary implementation, refreshing the row, which is not accessed in the current refresh period, in the DRAM according to the recorded row which is accessed in the current refresh period, includes: according to the recorded row, which is accessed in the current period, in the DRAM and respective rows contained in each group, determining whether the each group contains a row which is not accessed in the current refresh period; and for a group containing the row which is not accessed in the current refresh period, refreshing the row which is not accessed in the group.

In another aspect, an embodiment of the present application further provides a computer program product which includes a computer program. When the computer program is executed by a processor, the DRAM refresh method according to any embodiment of the present disclosure can be implemented.

In another aspect, an embodiment of the present application further provides a non-volatile computer-readable storage medium having a computer program stored thereon. When the computer program is executed by a processor, the DRAM refresh method according to any embodiment of the present disclosure can be implemented.

Other aspects will become apparent after the drawings and detailed description are read and understood.

BRIEF DESCRIPTION OF DRAWINGS

Accompanying drawings are used to provide a further understanding of technical solutions of the present application, form a part of the specification, and are used to explain the technical solutions of the present application together with the embodiments of the present application and are not intended to form limitations on the technical solutions of the present application.

DETAILED DESCRIPTION

Figure 1:
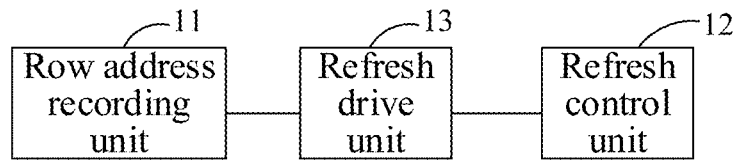
FIG. 1 is a schematic diagram of a DRAM refresh circuit according to an embodiment of the present application.

Multiple embodiments are described in the present application. However, the description is exemplary and unrestrictive. Moreover, it is apparent to those of ordinary skill in the art that there may be more embodiments and implementation solutions in the scope of the embodiments described in the present application. Although many possible combinations of features are shown in the accompanying drawings and discussed in specific implementations, many other combinations of the disclosed features are possible. Unless specifically limited, any feature or element in any embodiment may be used in combination with or in place of any other feature or element in any other embodiment.

Combinations of features and elements known to those of ordinary skill in the art are included and contemplated in the present application. Embodiments, features and elements already disclosed in the present application may be combined with any conventional features or elements to form a unique invention solution. Any feature or element in any embodiment may be combined with features or elements in other invention solutions to form another unique invention solution. Therefore, it should be understood that any of the features shown and/or discussed in the present application may be implemented alone or in any suitable combination. Furthermore, various modifications and variations may be made within the protection scope.

Further, when representative embodiments are described, the method and/or process may have been presented as acts in a particular sequence in the specification. However, the method or process does not depend on the particular sequence of the acts described herein, and the method or process should not be limited to the acts in the particular sequence. As will be understood by those of ordinary skill in the art, other sequences of acts are also possible. Therefore, the particular sequence of acts set forth in the specification should not be construed as limitation on the embodiments. Moreover, the method and/or process should not be limited to performing their acts in the described sequence, and those skilled in the art will readily appreciate that the sequence may be varied, and still remain within the essence and scope of the embodiments of the present application.

In addition, descriptions such as those relating to "first", "second" in the present application are used to distinguish in the descriptions only, and cannot be understood to indicate or imply their relative importance or imply a quantity of technical features indicated. Thus, the features defined with "first", "second" may explicitly or implicitly include at least one feature. In the descriptions of the present application, unless expressly specified otherwise, "multiple" means at least two, e.g., two, three, etc.

A traditional DRAM refresh method is to periodically refresh all rows in a DRAM in a concentrated manner or periodically and refresh rows in a DRAM in a dispersed manner. However, rows in the DRAM in a refresh process cannot be read. If all the rows in the DRAM are refreshed in a concentrated manner, other components are fully unable to access the DRAM during the refresh process, thus affecting work efficiency of the other components. Even if a mode of refreshing the rows periodically in a dispersed manner is adopted, the work efficiency of the other components is still reduced when a calculation unit needs to access the DRAM with a high frequency.

In some application scenarios, high-frequency and intensive access to a DRAM is required, and an impact of the DRAM refresh on the work efficiency is greater in this case. Hereinafter, a typical Proof Of Work (POW) chip will be taken as an example to explain. A DRAM refresh circuit in the present application is not limited to being applied in a proof of work chip, and may be applied in a chip or scenario with random access characteristics.

An Ethereum proof of work algorithm is a typical representative of algorithms with random access characteristics. Proof of work is widely used in the field of blockchain, and its typical characteristics are embodied in a process of digital cryptocurrency transactions. In order to prevent the transaction information from being tampered with by others, it is necessary to provide an answer or prove a specific arduous task, but this proof is difficult to give and requires a lot of calculation to obtain. The proof of work chip requires to perform frequent data operations in an operation process, and is usually composed of massive calculation units and storage units. The proof of work chip requires to perform a lot of data storage, and is restricted by chip manufacturing, process maturity, capacity and price. Usually, the storage units in the proof of work chip are composed of DRAM.

In the proof of work chip, assuming that a refresh period of the DRAM is Tf, time for refreshing all rows is Tr, and a calculation efficiency of the calculation unit is Te, Te=(Tf−Tr)/Tf=1−Tr/Tf, where (Tf−Tr) is actual calculation time of the calculation unit. Because time required for refreshing each row of the DRAM is fixed, the more rows are refreshed, the larger Tr taken for refreshing the rows is, and the greater an amplitude by which the actual calculation time of the calculation unit is reduced is. Because the calculation unit accesses the DRAM intensively, in a condition of a constant computing bandwidth, actual computing time of the calculation unit in a limited time range will decide the calculation efficiency, which means that with an increase in a quantity of rows, time that the calculation unit can spend on calculating is less, and the calculation efficiency of the calculation unit decreases, thus affecting the performance of the chip.

In addition, with an increased operating temperature of the proof of work chip, Tf decreases, and Tr remains unchanged, so Te decreases. Usually, when the temperature is greater than 85 degrees Celsius and less than 100 degrees Celsius, Tf decreases to half of that below 85 degrees Celsius, and Tf decreases by half again on basis of that greater than 85 degrees Celsius and less than 100 degrees Celsius when the temperature is greater than 100 degrees Celsius. It can be seen that with the increase of temperature, the calculation efficiency of the calculation unit will greatly decrease.

A DRAM refresh circuit is provided in an embodiment of the present application. As shown in FIG. 1, the DRAM refresh circuit includes a row address recording unit 11, a refresh drive unit 12 and a refresh control unit 13.

The row address recording unit 11 is configured to record a row, which is accessed in a current refresh period, in a DRAM.

The refresh drive unit 12 is configured to perform a refresh operation when the refresh drive unit 12 is invoked.

The refresh control unit 13 is configured to, when refresh is triggered, invoke the refresh drive unit 12 to refresh a row, which is not accessed in the current refresh period, in the DRAM according to a record of the row address recording unit 11.

In this embodiment, the row address recording unit 11 may empty a previous record at beginning of each refresh period, and restart recording. Therefore, the refresh control unit 13 may know an access situation of rows in the DRAM in the current refresh period based on the record of the row address recording unit 11, thereby to refresh rows which are not accessed.

In this embodiment, the rows in the DRAM may be refreshed by, but not limited to, a read operation. The refresh drive unit 12 may include, but not limited to, a read circuit. After determining the rows which are not accessed in the current refresh period, the refresh control unit 13 may invoke the refresh drive unit 12 according to row addresses of the rows.

In this embodiment, not all of the rows which are accessed in the current refresh period are refreshed any longer, so a quantity of refreshed rows can be reduced, and time taken for refreshing the DRAM is reduced, which means time that the DRAM cannot be accessed can be reduced, thereby increasing effective working time length of other components accessing the DRAM, and improving the work efficiency and performance of the chip when the DRAM refresh circuit is applied in the chip.

In this embodiment, by studying and analyzing scenarios with a high access frequency and strong randomness, it is found that the probability that the rows in the DRAM are not accessed in a refresh period is very small. Therefore, a solution that breaks a conventional refresh idea is proposed for the scenarios. In the solution, the refresh operation is limited to the rows which are not accessed in the current refresh period by recording and determining. Since a quantity of rows to be refreshed after the recording and determining is very small, the quantity of rows to be refreshed can be greatly reduced, and time overhead for the recording and determining can be approximately negligible compared with very large benefits obtained.

In an implementation of this embodiment, when the DRAM refresh circuit is applied to a proof of work chip, due to reduced Tr, Te can be significantly improved in a condition that Tf is unchanged. Specifically, since a calculation unit in the proof of work chip accesses the DRAM frequently and has strong randomness, a probability that all rows in the DRAM are accessed in one refresh period is very high. Taking a DRAM with R rows and S columns as an example, theoretically, when a quantity of access requests of a calculation unit is j, an expected probability that each row in the DRAM is accessed in each refresh period is:

$$p = \frac{\sum_{k=1}^{j} a_k}{R} \left( a_0 = 1, a_k = \frac{R - \sum_{i=1}^{k-1} a_i}{R} \right).$$

Assuming that a clock cycle adopted by the proof of work chip is 5 ns, a quantity j of access requests generated in 16 ms is equal to 333333, and a quantity R of the rows in the DRAM is equal to 16384, the expected probability that all rows in the DRAM are accessed in one refresh period is approximately equal to 0.9999998541201. Theoretically, when the quantity of the access requests in limited time reaches a certain number, the probability that there is a row, which is not accessed, in the DRAM tends to zero. Therefore, in this implementation, theoretically it may tend that all rows of the DRAM does not require to be refreshed.

In addition to this implementation, other scenarios where the DRAM is frequently accessed and there is strong randomness are similar. Since the possibility that a row in the DRAM is not accessed in one refresh period is relatively small, in other words, a quantity of rows that are not accessed in one refresh period is relatively small, the quantity of rows that require to be refreshed is greatly reduced, and the work efficiency and performance of the components accessing the DRAM can be significantly improved.

In this embodiment, each of the row address recording unit 11, the refresh drive unit 12, and the refresh control unit 13 may be a hardware module in a chip where the DRAM is located.

In an exemplary embodiment, the DRAM refresh circuit may further include a request storage unit and a row address decoding unit.

The request storage unit is configured to buffer an access request for the DRAM.

The row address decoding unit is configured to parse a row address in the access request and decode the row address from binary data into decimal data.

The row address recording unit 11 recording the accessed row, which is accessed in the current refresh period, in the DRAM, includes: the row address recording unit 11 records the row, which is accessed in the current refresh period, in the DRAM according to the decimal row address obtained by decoding of the row address decoding unit.

In this embodiment, when an amount of accesses to the DRAM is large and the DRAM is accessed frequently, the access requests need to be buffered because actual transmission efficiency of the DRAM is limited. The request storage unit may, but not limited to, use a First Input First Output (FIFO) memory, wherein the received access requests are sequentially placed in the FIFO, and an access request first received is decoded first.

In this embodiment, the row address decoding unit may be implemented by hardware such as a decoding circuit or a decoder.

In this embodiment, the DRAM refresh circuit may reuse the existing request storage unit and row address decoding unit in the chip where the DRAM is located. The access request contains a row access address and a column access address for the DRAM, the chip where the DRAM is located may include an I/O unit, and a calculation unit may access data in a corresponding address of the DRAM by sending an access request to the I/O unit. The I/O unit may be built into the calculation unit as a part of the calculation unit. Before accessing, when the access request is needed to be buffered first and the row address and the column address in the access request are needed to be decoded, the circuits and/or devices for caching and decoding may be reused by the DRAM refresh circuit. In other words, the DRAM refresh circuit may share a decoding result with the I/O unit. The row address recording unit 11 and the I/O unit may operate in parallel: the I/O unit accesses the DRAM according to the decoded decimal row address and the decoded decimal column address, while the row address recording unit 11 may perform recording in parallel according to the decoded row address.

In an exemplary embodiment, the row address recording unit 11 recording the row, which is accessed in the current refresh period, in the DRAM may include: the row address recording unit 11 is configured to store a row flag bit which corresponds to each of all rows in the DRAM and resets all row flag bits at beginning of each refresh period, and sets a corresponding row flag bit according to a row to be accessed in an access request for the DRAM.

In this embodiment, the term "reset" may mean to modify a value of a row flag bit to be 0 regardless of its original value, and the term "set" may mean to modify the value of the row flag bit to be 1 regardless of its original value.

In an alternative of this embodiment, values of all row flag bits may be modified to be 1 at the beginning of the refresh period, and values of row flag bits corresponding to rows which are accessed may be modified to be 0. In an exemplary implementation, other values are used to distinguish rows which are not accessed and rows which are accessed in the current refresh period. In an exemplary implementation, all row addresses in the DRAM are loaded at the beginning of the refresh period, and row addresses involved in the access request are deleted, so that when a refresh threshold is reached, the rows which are not accessed in the current refresh period may be known according to remaining row addresses.

In this embodiment, the row address recording unit 11 may know the beginning of the refresh period from the refresh control unit 13, and the refresh control unit 13 invokes the refresh drive unit 12 to refresh, and then notifies the row address recording unit of the beginning of the refresh period, or directly resets the row address recording unit.

In this embodiment, whether a row is accessed may be conveniently and quickly recorded by the row flag bit, and the overhead for determining whether a row is accessed is small.

In an implementation of this embodiment, the row address recording unit 11 may be a first register, a quantity of bits in the first register is equal to the quantity of rows in the DRAM, and there may be a one-to-one correspondence between the rows in the DRAM and the bits in the first register.

In this implementation, the bits in the register are used as the row flag bits, and a corresponding bit may be directly positioned through the decimal row address, which is convenient and fast and has low cost.

In an alternative of this implementation, the row flag bits may be recorded in another manner, for example, a manner in which all the rows in the DRAM are split into N groups, there are M rows in each group, and an N×M matrix is used to store row flag bits for all the rows. For another example of a manner, in the manner the quantity of bits in the first register may be greater than or equal to the quantity of the rows in the DRAM, so that some bits may be reserved for standby.

In an exemplary embodiment, the DRAM refresh circuit may further include a row address splitting unit configured to record respective rows contained in each of N groups; wherein, all rows in the DRAM are split to the N groups in advance.

Accordingly, the refresh control unit 13 invoking the refresh drive unit 12 to refresh the row, which is not accessed in the current refresh period, in the DRAM according to the record of the row address recording unit 11, may include: the refresh control unit 13 determines whether each group contains a row which is not accessed in the current refresh period, respectively, based on the record of the row address recording unit 11 and the respective rows contained in the each group recorded by the row address splitting unit; for a group containing a row that is not accessed in the current refresh period, invoke the refresh drive unit 12 to refresh the row that is not accessed in the group.

In this embodiment, determination may be made for each group in parallel, so that the determination can be quickened, and the time overhead increased by screening the rows which are not accessed in the current refresh period can be reduced.

In this embodiment, the row address splitting unit may record addresses of rows in each group or serial numbers of the row flag bits corresponding to the rows in each group. For example, a group contains rows with addresses 1-100, and the row flag bits corresponding to these 100 rows are bits 0-99 in the register, the row address splitting unit may records the row addresses 1-100 or the serial numbers 0-99 of the row flag bits. Regardless of the recording form used, since there is a one-to-one correspondence between the row flag bits and the rows, so it can be known that which rows are contained in each group, and it can be determined that which rows are accessed and/or which rows are not accessed in the current refresh period through the record of the row address recording unit 11.

In this embodiment, a value of N may be set in advance, or may be set according to the quantity of the all rows in the DRAM. Generally, the all rows in the DRAM may be split into N groups as evenly as possible, a value of N determines the quantity of rows in each group. Which rows contained in each group may be determined in advance and recorded in the row address splitting unit.

In this embodiment, when determination is made in a unit of a group, individual determination logics may be set for each group. The more rows in a group, the more determination logics are needed, and the more time is needed to complete the determination. Therefore, if there are too many rows in the group, the cost of the determination logics required by each group inevitably increases, and the acceleration benefit from the parallel determination is greatly reduced. However, if there are too few rows in each group and N is large, there are too many determination logics in all the groups due to the too large N, which greatly increases the cost. Therefore, the value of N needs consider both the cost and the acceleration benefit.

In an implementation of the present embodiment, N and M may be set in advance and input to the row address splitting unit as configuration parameters. The row address splitting unit may record rows contained in each group according to N and M, thereby to split all rows in the DRAM into different groups. For example, if there are 16384 rows in the DRAM, N is 16 and M is 1024, then the row address splitting unit may record rows 0-1023 as a first group, record rows 1024-2047 as a second group, and so on, until recoding for 16 groups is completed.

In an implementation of the present embodiment, the refresh control unit 13 determining whether each group contains a row which is not accessed in the current refresh period, respectively, based on the record of the row address recording unit 11 and the respective rows contained in each group recorded by the row address splitting unit, may include: the refresh control unit 13 acquires, from the row address recording unit 11, values of row flag bits corresponding to the each group respectively according to the respective rows contained in the each group recorded by the row address splitting unit, performs a logical operation on the values of the row flag bits corresponding to the each group in parallel, uses an operation result of the logical operation as a group flag of the each group, and determines whether the each group contains a row, which is not accessed in the current refresh period, respectively, according to the group flag of the each group.

In this implementation, the group flag may be obtained by, but not limited to, a logical AND operation. A value of a row flag bit of a row which is accessed is 1, and a value of a row flag bit of a row which is not accessed is 0. As long as a value of a row flag bit of any row in a group is 0, a value of a group flag of the group is 0 after the AND operation is performed on multiple row flag bits of the rows in the group. The value of the group flag of the group being 0 means that the group contains a row which is not accessed in the current refresh period. In this way, N groups may be determined in parallel only with N simple digital logic circuits.

In an alternative of the present implementation, when a value of a row flag bit of a row which is accessed is 0 and a value of a row which is not accessed is 1, the group flag may be obtained by a logical OR operation. That is, as long as a value of a row flag bit of any row in the group is "1", the value of the group flag of the group is "1", which means that the group contains a row which is not accessed in the current refresh period. In an exemplary implementation, for each group, all the row flag bits of the group may be directly traversed to find out whether there is a row flag bit with a specific value (i.e., a value indicating that the row is not accessed in the current refresh period, such as 0) in the group, and if so, it can be determined that the group contains a row which is not accessed.

The implementation may be achieved by a very simple logic circuit. For multiple groups, multiple logic circuits may be used for parallel calculation to obtain the group flags.

In an exemplary embodiment, the DRAM refresh circuit may further include a refresh timing unit configured to record a working time length of the DRAM since a last refresh, and when a refresh threshold is reached, trigger the refresh control unit 13 to perform refreshing, and every time a refresh period begins (i.e., after the refresh), start timing again.

In this embodiment, a counter may be used to implement the refresh timing unit, the time length is represented by a quantity of clock cycles, and a value of the counter is increased by 1 when one clock cycle is increased. The refresh control unit 13 may determine whether a refresh request is triggered by monitoring the value of the counter. The counter is cleared at the beginning of each refresh period, that is, the counter is restarted after each refresh.

In an alternative of the present embodiment, a counter or timer may be built in the refresh control module 13, to automatically trigger refresh when the refresh threshold is reached or the timer expires.

A proof of work chip is further provided in an embodiment of the present application, which includes a DRAM, a calculation unit and a DRAM refresh circuit in any of the above-mentioned embodiments.

The calculation unit is configured to access the DRAM and perform calculation.

The DRAM refresh circuit is configured to refresh the DRAM.

The DRAM refresh circuit may partially reuse the devices and/or circuits used when the calculation unit accesses the DRAM, such as the cache, decoding circuits, etc. The proof of work chip may include an I/O unit, or the calculation unit itself has an I/O function, to access a row in the DRAM according to the access request.

Figure 2:
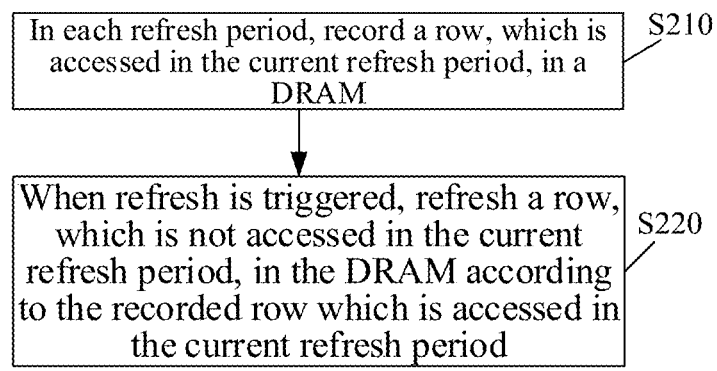
FIG. 2 is a flowchart of a DRAM refresh method according to an embodiment of the present application.

A DRAM refresh method is further provided in an embodiment of the present application. As shown in FIG. 2, the method for refreshing a DRAM includes acts S210-S220.

In act S210, in each refresh period, a row, which is accessed in a current refresh period, in the DRAM is recorded.

In act S220, when refresh is triggered, a row, which is not accessed in the current refresh period, in the DRAM is refreshed according to the recorded row which is accessed in the current refresh period.

The DRAM refresh method in the present embodiment may be applied to, but not limited to, the DRAM refresh circuit provided in any of the above-mentioned embodiments.

In an exemplary embodiment, refreshing the row, which is not accessed in the current refresh period, in the DRAM according to the recorded row which is accessed in the current refresh period, includes: according to the recorded row, which is accessed in the current period, in the DRAM and respective rows contained in each group, determining whether the each group contains a row which is not accessed in the current refresh period respectively; and for a group containing the row which is not accessed in the current refresh period, refreshing the row which is not accessed in the group.

In an implementation of the present embodiment, according to the recorded row, which is accessed in the current period, in the DRAM and the respective rows contained in each group, determining whether the each group contains a row which is not accessed in the current refresh period respectively, may include: according to the recorded respective rows contained in the each group, acquiring, respectively, values of row flag bits corresponding to the each group; performing a logical operation on the values of the row flag bits corresponding to the each group in parallel, using an operation result as the group flag of the each group; and according to a value of the group flag of the each group, determining whether the each group contains a row which is not accessed in the current refresh period respectively.

The above-mentioned embodiments are described in detail below with two examples.

First Example

A DRAM refresh circuit is provided in this example, which is applied in a proof of work chip. The DRAM refresh circuit is configured to refresh a DRAM in the proof of work chip. The circuit may be provided in the proof of work chip, and each unit in the circuit may be a module in the proof of work chip.

A DRAM matrix with a size of 16384×64 is taken as an example. The DRAM matrix is applied in the proof of work chip. Generally, data maintain time in the DRAM is 64 ms (milliseconds), that is, if there is no read or write operation for rows within 64 ms, the data will be lost. Therefore, it is required to refresh the rows that are not accessed within a duration of 64 ms, to ensure that the data in the DRAM are not lost.

In this example, assuming that the clock cycle of the proof of work chip is 5 ns, if all of 16384 rows are refreshed in a concentrated manner within 64 ms, the refresh time is about 2 ms. Assuming a refresh period is Tf=64 ms and the refresh time is Tr=2 ms, an actual calculation efficiency of the calculation unit is Te=(64−2)/64=96.875%. As a working temperature of the proof of work chip increases, Tf decreases. For example, Tf=64 ms when the working temperature is less than 85 degrees Celsius, Tf=32 ms when the working temperature is greater than 85 degrees Celsius and less than 100 degrees Celsius, and Tf=16 ms when the working temperature is greater than 100 degrees Celsius. However, Tr does not change with the increase of the working temperature, so Te further decreases with the increase of the working temperature.

Figure 3:
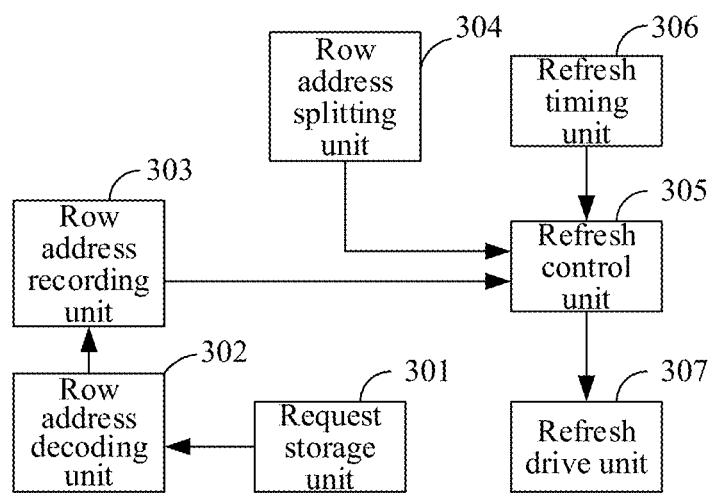
FIG. 3 is a schematic diagram of a DRAM refresh circuit in a first example.

In this example, the calculation efficiency of the proof of work chip is improved by reducing Tr, thus significantly improving the calculation efficiency Te. As shown in FIG. 3, the DRAM refresh circuit in this example includes a request storage unit 301 configured to buffer a random access request of a calculation unit for the DRAM.

In the proof of work chip, the calculation unit initiates the random access request for the DRAM. Because an actual transmission efficiency of the DRAM is limited, it is required to buffer requests of the calculation unit to improve an overall computing performance.

In this example, the request storage unit 301 may use a FIFO memory.

The DRAM refresh circuit further includes a row address decoding unit 302 configured to parse a row address in the random access request and decode the row address from binary data into decimal data.

The random access request of the calculation unit contains the row address and the column address for accessing the DRAM, so it is required to parse the row address. 16384 rows correspond to a 14-bit binary row address. After the 14-bit binary row address is parsed, it is converted into a serial number of a decimal row address corresponding to one of rows 0-16383.

The DRAM refresh circuit further includes a row address recording unit 303 configured to record the row which is accessed in the DRAM.

In order to save a resource overhead of the chip, a first register with 16384 bits is used as the row address recording unit 303 in this example, and the accessed rows are marked in the first register. There is a one-to-one correspondence between the bits in the first register and the rows in the DRAM. For example, the bits 0-16383 correspond to the rows 1-16384 in the DRAM, respectively. Recording is performed by setting the bit corresponding to the serial number of the parsed row address in the first register to be 1. At the beginning of next refresh period, all row flag bits in the first register are reset. If a bit corresponding to a row which is accessed in the current refresh period in the first register has already been 1, the bit may be remained or set to be 1 again.

The DRAM refresh circuit further includes a row address splitting unit 304 configured to record respective rows contained in each of N groups.

In this example, a quantity of groups may be determined in advance, that is, N may be determined in advance. If the quantities of rows contained in each group are same, M may be obtained directly. Rows contained in each group may be known from N and M, and recorded in the row address splitting unit 304.

In this example, the respective rows contained in each group may be represented by the serial numbers of the row addresses or the serial numbers of the row flag bits in the register. For example, assuming that N=16, that is, 16384 rows are split into 16 groups, with 1024 rows in each group, then the row address splitting unit 304 may record the serial numbers of the row flag bits in the 16 groups as 0-1023, 1024-2047, . . . , 15360-16383, respectively.

The DRAM refresh circuit further includes a refresh timing unit 306 configured to record working time length for the last refresh of the DRAM, and when a refresh threshold is reached, trigger a refresh request, and after the refresh start timing again.

In this example, a counter may be used for recording, and the time length is represented by a quantity of clock cycles. When a value of the counter reaches the refresh threshold, a refresh request is triggered, the counter is cleared, and after the refresh the counter is restarted.

The DRAM refresh circuit further includes a refresh drive unit 307 configured to perform refreshing.

In this example, the refresh may be performed by, but not limited to, a read operation. The refresh drive unit 307 may, but not limited to, include a read circuit.

The refresh control unit 305 is configured to determine one or more groups containing rows which are not accessed when the refresh request is triggered, and invoke the refresh drive unit 307 to refresh M rows in the determined groups.

In this example, according to respective rows contained in each group recorded by the row address splitting unit 304 and the rows accessed in the current refresh period recorded in the row address recording unit 303, the refresh control unit 305 may determine whether each group contains a row which is not accessed in the current refresh period, and set a value of a group flag according to a determination result, for example, if a group contains a row which is not accessed, the value of the group flag is set to be 0; if a group does not contain a row which is not accessed (that is, all rows in the group are accessed in the current refresh period), the value of the group flag is set to 1.

In this example, the refresh control unit 305 may use a combinational logic to perform determination. For example, if from the record of the row address splitting unit 304 it may be known that a first group contains row flag bits 0-1023, values of the row flag bits 0-1023 are read from the row address recording unit 303, an AND operation may be performed by a digital logic circuit, and a result of the AND operation is taken as a value of the group flag of the first group. Therefore, if all the rows in the first group have been accessed in the current refresh period, that is, all the values of row flag bits 0-1023 are 1, then the result of the AND operation is 1, that is, the value of the group flag of the first group is 1.

In this example, N is variable. The larger the N, the smaller the quantity of rows contained in each group, and the less combinational logic the refresh control unit 305 needs to provide for each group. On the contrary, the smaller N, the more rows contained in each group, and the more combinational logic the refresh control unit 305 needs to provide for each group.

In this example, the refresh control unit 305 may use a second register to store the group flag of each group, and invoke the refresh drive unit 307 according to the values of the group flags, to refresh a group of which the group flag is 0.

In this example, refreshing the group is to refresh only a row that is not accessed in the current refresh period according to the values of the row flag bits. For example, if it is determined that a second group contains a row which is not accessed, it is required to refresh the second group according to the values of row flag bits 1024-2047 of rows contained in the second group, that is, refresh rows corresponding to row flag bits with a value of 0.

Second Example

Figure 4:
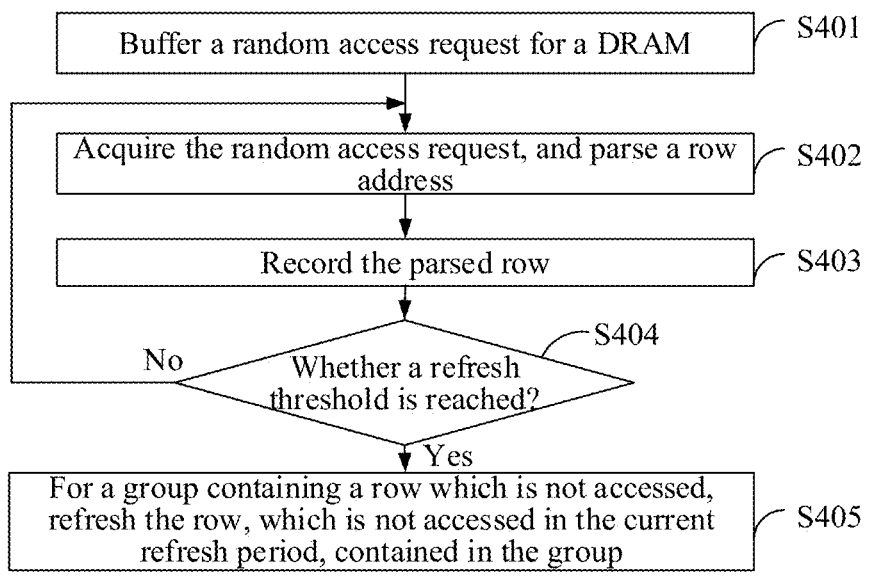
FIG. 4 is a flowchart of a DRAM refresh method in a second example.

A refresh method is provided in this example, which is applied to the DRAM refresh circuit provided in the first example. As shown in FIG. 4, the refresh method includes acts S401-S404.

In S401, a random access request for a DRAM is buffered. This act may be implemented by, but not limited to, an FIFO memory.

In S402, the random access request is acquired, and a row address is parsed. This act may be implemented by, but not limited to, a decoding circuit that converts a binary address in the random access request into a serial number of a decimal row address.

The act S401 and the acts S402-S404 may be performed in parallel. That is, caching is performed whenever there is a random access request, while the resolving in the act S402 is performed whenever there is still a buffered random access request that is not processed, and refresh is not being performed.

In S403, the parsed row is recorded. The act may be implemented by, but not limited to, a first register in which bits are one-to-one correspondence with the rows in the DRAM, wherein each bit is used as a row flag bit of a corresponding row. By setting a bit corresponding to an accessed row, the accessed row is recorded. At a beginning of each refresh period, all the bits in the first register are reset, that is, recording are done again in each refresh period, so as to ensure that rows corresponding to set bits are the rows accessed in the current refresh period.

In S404, whether working time length of the DRAM in the current refresh period reaches the refresh threshold is determined; when the working time length of the DRAM in the current refresh period reaches the refresh threshold, act S405 will be performed; when not, the acts S402-S404 will be performed continuously. For example, if the refresh period is 64 ms, it is determined that the refresh threshold value is reached when the working time length of the refresh period reaches 64 ms. In an exemplary implementation, the refresh threshold is slightly less than the refresh period, for example, the refresh threshold is 63.9 ms, time overhead for determining whether the group contains a row that is not accessed in the current refresh period is left.

In the act, the working time length may be determined by counting the clock cycles.

In act S405, for one or more groups containing a row which is not accessed, the rows, which are not accessed in the current refresh period, contained in the one or more groups are refreshed respectively.

In this act, each of N groups split in advance may be determined, wherein whether the group contains a row which is not accessed is determined according to the row flag bits contained in the group. If at least one row flag bit contained in the group is not set, at least one row corresponding to the unset at least one row flag bit is determined according to the bits corresponding to the rows contained in the group, and the determined at least one row is refreshed. If the group does not contain a unset row flag bit, in other words, the rows corresponding to all row flag bits in the group have been accessed in the current refresh period, no row in the group is refreshed.

It can be seen that in this example, when all the rows in the group are accessed in the refresh period, the group will not be refreshed, and only a row, which is not accessed, contained in the group to be refreshed, will be refreshed. It can be seen that in this example, the quantity of refreshed rows is reduced, so Tr is reduced, and when Tf remains unchanged, higher calculation efficiency can be achieved.

Figure 5:
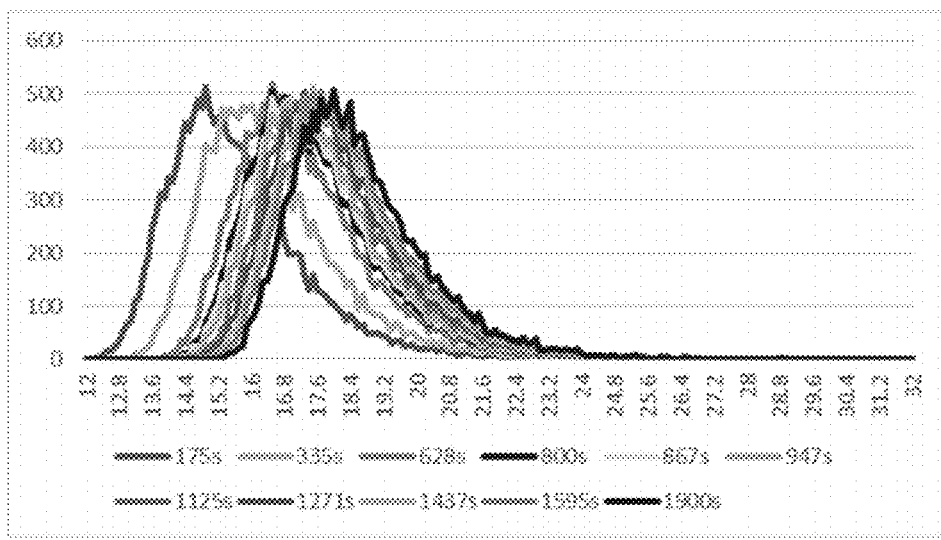
FIG. 5 shows a statistic chart of time intervals for randomly accessing rows in a DRAM by a calculation unit in a proof of work chip in the second example.

FIG. 5 shows a statistic chart of time intervals for randomly accessing rows in a DRAM by a calculation unit in predetermined simulation time. The abscissa in this chart represents a maximal time interval between two adjacent accesses to a same row. For example, for a certain row, a time interval between a first access and a second access is 15 ms, and a time interval between the second access and a third access is 18 ms, then the maximum time interval is 18 ms; when a time interval between two adjacent accesses exceeds 18 ms in subsequent accesses, the time interval is taken as the maximum time interval. An ordinate in FIG. 5 shows a quantity of rows in all rows in the DRAM of which the maximum time interval between two adjacent accesses is a certain value in the abscissa. For example, there are 502 rows with a maximum interval of 15 ms and 1 row with a maximum interval of 12 ms. Multiple curves in FIG. 5 correspond to different total simulation time lengths, respectively, which are shown as legends at the bottom of FIG. 5. The total simulation time lengths corresponding to the curves from left to right are getting longer. For example, a total simulation time length of 175 seconds corresponds to the leftmost curve in FIG. 5, and the maximum time interval between two adjacent moments to access a same row is 28.8 ms. For another example, a total simulation time of 1900 seconds corresponds to the rightmost curve in FIG. 5, and the maximum time interval between two adjacent moments to access a same row is 31.1 ms.

It can be seen from FIG. 5 that as continuous access time of the calculation unit to the DRAM gets longer (the total simulation time length means the continuous access time of the calculation unit to the DRAM), the maximum time interval for accessing a same row tends to be stable and will not exceed 32 ms.

In this example, in a normal circumstance, a refresh period is 64 ms, the best is that no row is required to be refreshed. In other words, each row in the DRAM has been accessed at least once in the refresh period, that is, a quantity of rows required to be refreshed is 0. Even in a worst working condition, such as a refresh period of 16 ms, the quantity of rows to be refreshed in this example is about 8000. Assuming that a chip clock cycle is 5 ns, the DRAM is refreshed in a traditional manner, refreshing 16384 rows takes 2 ms. However, in this example, the quantity of rows required to be refreshed in a normal circumstance is extremely low, almost 0, even in the worst condition, only a part of rows are refreshed, which saves the time taken for refreshing.

It can be seen that compared with traditional concentrated refresh method, in this example, both the quantity of refreshed rows and the time taken for refreshing are effectively reduced. Both effective calculation time of the calculation unit and the overall calculation performance of the system are improved.

An embodiment of the present application further provides a computer program product which includes a computer program. When the computer program is executed by a processor, the DRAM refresh method according to any embodiment of the present disclosure can be implemented.

An embodiment of the present application further provides a non-volatile computer-readable storage medium having a computer program stored thereon. When the computer program is executed by a processor, the DRAM refresh method according to any embodiment of the present disclosure can be implemented.

It can be understood by those of ordinary skill in the art that all or some acts in the method disclosed above and functional modules/units in the system and the apparatus may be implemented as software, firmware, hardware, and proper combinations thereof. In a hardware implementation, division of the functional modules/units mentioned in the above description is not always division corresponding to physical components. For example, a physical component may have multiple functions, or multiple physical components may cooperate to execute a function or act. Some or all of the components may be implemented as software executed by a processor, e.g., a digital signal processor or a microprocessor, or as hardware, or as an integrated circuit, e.g. an application specific integrated circuit. Such software may be distributed on a computer-readable medium, which may include a computer storage medium (or a non-transitory medium) and a communication medium (or a transitory medium). As is well known to those of ordinary skill in the art, the term "computer storage medium" includes volatile and non-volatile, removable and non-removable media implemented in any method or technique for storing information, such as computer-readable instructions, data structures, program modules, or other data. Computer storage medium includes, but is not limited to, RAM, ROM, EEPROM, flash memory or other memory technology, CD-ROM, digital versatile disk (DVD) or other optical disk storage, magnetic cartridge, magnetic tape, magnetic disk storage or other magnetic storage devices, or any other medium that may be used to store desired information and may be accessed by a computer. In addition, it is well known to those of ordinary skill in the art that the communication medium typically contains computer readable instructions, data structures, program modules, or other data in modulated data signals such as carriers or other transmission mechanisms, and may include any information delivery medium.

The invention claimed is:

1. A Dynamic Random Access Memory (DRAM) refresh circuit, comprising:
    a row address recording circuit, configured to record a row, which is accessed in a current refresh period, in a DRAM;
    a refresh drive circuit, configured to perform a refresh operation when the refresh drive circuit is invoked; and
    a refresh control circuit, configured to, when refresh is triggered, invoke the refresh drive circuit to refresh a row, which is not accessed in the current refresh period, in the DRAM according to a record of the row address recording circuit;
    wherein that the row address recording circuit is configured to record the row, which is accessed in the current refresh period, in the DRAM, comprises:
    the row address recording circuit is configured to store respective row flag bits corresponding to all rows in the DRAM, and reset all row flag bits at beginning of each refresh period, and set a corresponding row flag bit according to a row to be accessed in an access request for the DRAM.

2. The DRAM refresh circuit of claim 1, wherein the row address recording circuit is a register, a quantity of bits in the register is equal to a quantity of rows in the DRAM, and there is a one-to-one correspondence between the rows in the DRAM and the bits in the register.

3. The DRAM refresh circuit of claim 1, further comprising:
    a row address splitting circuit, configured to record respective rows contained in each of N groups; wherein, the all rows in the DRAM are split into the N groups in advance;
    wherein that the refresh control circuit is configured to invoke the refresh drive circuit to refresh the row, which is not accessed in the current refresh period, in the DRAM according to the record of the row address recording circuit, comprises:
    the refresh control circuit is configured to, determine whether the each group contains a row which is not accessed in the current refresh period respectively, according to the record of the row address recording circuit and the respective rows contained in the each group recorded by the row address splitting circuit; for a group containing a row which is not accessed in the current refresh period, invoke the refresh drive circuit to refresh the row which is not accessed in the group.

4. The DRAM refresh circuit of claim 3, wherein that the refresh control circuit is configured to determine whether the each group contains the row which is not accessed in the current refresh period respectively, according to the record of the row address recording circuit and the respective rows contained in the each group recorded by the row address splitting circuit, comprises:
    the refresh control circuit is configured to acquire, from the row address recording circuit, values of row flag bits corresponding to the each group respectively according to the respective rows contained in the each group recorded by the row address splitting circuit, perform a logical operation on the values of the row flag bits corresponding to the each group in parallel, use an operation result of the logical operation as a group flag of the each group, and determine whether the each group contains a row, which is not accessed in the current refresh period, according to a value of the group flag of the each group.

5. The DRAM refresh circuit of claim 1, further comprising:
a request storage circuit, configured to buffer the access request for the DRAM;
a row address decoding circuit, configured to parse a row address in the access request and decode the row address from binary data into decimal data;
wherein that the row address recording circuit is configured to record the row, which is accessed in the current refresh period, in the DRAM, comprises:
the row address recording circuit is configured to record the row, which is accessed in the current refresh period, in the DRAM, according to a decimal row address obtained by decoding of the row address decoding circuit.

6. The DRAM refresh circuit of claim 1, further comprising: a refresh timing circuit, configured to record a working time length of the DRAM since a last refresh, when a refresh threshold is reached, trigger the refresh control circuit to perform refreshing, and every time a refresh period begins, start timing again.

7. A proof of work chip, comprising: a Dynamic Random Access Memory (DRAM), a calculation circuit, and the DRAM refresh circuit of claim 1; wherein
the calculation circuit is configured to access the DRAM and perform calculation; and
the DRAM refresh circuit is configured to refresh the DRAM.

8. A Dynamic Random Access Memory (DRAM) refresh method, comprising:
in each refresh period, recording a row, which is accessed in the current refresh period, in a DRAM; and
when refresh is triggered, refreshing a row, which is not accessed in the current refresh period, in the DRAM according to the recorded row which is accessed in the current refresh period;
wherein recording the row, which is accessed in the current refresh period, in the DRAM comprises:
storing respective row flag bits corresponding to all rows in the DRAM, and resetting all row flag bits at beginning of the each refresh period, and setting a corresponding row flag bit according to a row to be accessed in an access request for the DRAM.

9. The DRAM refresh method of claim 8, wherein refreshing the row, which is not accessed in the current refresh period, in the DRAM according to the recorded row which is accessed in the current refresh period, comprises:
according to the recorded row, which is accessed in the current period, in the DRAM and respective rows contained in each group, determining whether the each group contains a row which is not accessed in the current refresh period respectively; and
for a group containing a row which is not accessed in the current refresh period, refreshing the row which is not accessed in the group.

10. A non-volatile computer-readable storage medium having a computer program stored thereon, wherein when the computer program is executed by a processor, the DRAM refresh method of claim 8 is implemented.

11. The DRAM refresh circuit of claim 5, wherein the request storage circuit comprises a First Input First Output (FIFO) memory.

12. The DRAM refresh circuit of claim 1, wherein
the refresh control circuit is configured to notify the row address recording circuit of beginning of a refresh period after the refresh control circuit invokes the refresh drive circuit to perform refreshing.

13. The DRAM refresh circuit of claim 1, wherein
the refresh control circuit is configured to directly reset the row address recording circuit after the refresh control circuit invokes the refresh drive circuit to perform refreshing.

14. The DRAM refresh circuit of claim 6, wherein the working time length is determined by counting clock cycles.

15. The DRAM refresh method of claim 9, wherein refreshing the row, which is not accessed in the current refresh period, in the DRAM according to the recorded row which is accessed in the current refresh period, comprises:
acquiring, values of row flag bits corresponding to the each group respectively according to the recorded respective rows contained in the each group; performing a logical operation on the values of the row flag bits corresponding to the each group in parallel, using an operation result of the logical operation as a group flag of the each group; and according to a value of the group flag of the each group, determining whether the each group contains a row, which is not accessed in the current refresh period, according to a value of the group flag of the each group.

16. The DRAM refresh method of claim 8, further comprising:
buffering the access request for the DRAM;
parsing a row address in the access request and decoding the row address from binary data into decimal data;
wherein recording the row, which is accessed in the current refresh period, in the DRAM comprises:
recording the row, which is accessed in the current refresh period, in the DRAM, according to a decimal row address obtained by decoding.

17. The DRAM refresh method of claim 8, further comprising:
recording a working time length of the DRAM since a last refresh.

18. The DRAM refresh method of claim 17, wherein the working time length is determined by counting clock cycles.

* * * * *